(12) United States Patent
Dodoc et al.

(10) Patent No.: US 8,858,099 B2
(45) Date of Patent: Oct. 14, 2014

(54) ANAMORPHIC OBJECTIVE

(75) Inventors: Aurelian Dodoc, Heidenheim (DE); Christian Bannert, Aalen (DE); Vladan Blahnik, Oberkochen (DE); Holger Sehr, Weimar (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 13/523,232

(22) Filed: Jun. 14, 2012

(65) Prior Publication Data

US 2013/0022345 A1 Jan. 24, 2013

(30) Foreign Application Priority Data

Jun. 14, 2011 (DE) .......................... 10 2011 077 509

(51) Int. Cl.
*G03B 17/00* (2006.01)
*G02B 13/08* (2006.01)

(52) U.S. Cl.
CPC ..................................... *G02B 13/08* (2013.01)
USPC ............................. 396/439; 359/668; 359/771

(58) Field of Classification Search
CPC .... G02B 13/08; G02B 13/06; G02B 27/0966; G02B 5/005; G02B 27/58; G02B 3/06
USPC ................... 396/439; 359/668, 671, 739, 740
See application file for complete search history.

(56) References Cited

U.S. PATENT DOCUMENTS

| | | | |
|---|---|---|---|
| 3,658,410 A | 4/1972 | Willey | |
| 3,990,785 A | 11/1976 | Hirose | |
| 4,362,366 A | 12/1982 | Gottschalk | |
| 4,368,955 A | 1/1983 | Masson | |
| 5,671,093 A | 9/1997 | Jung et al. | |
| 5,731,908 A | 3/1998 | Kim | |
| 6,310,731 B1 | 10/2001 | Wartmann et al. | |
| 6,728,040 B1 | 4/2004 | Mikhailov et al. | |
| 2002/0003670 A1 | 1/2002 | Oliva | |
| 2006/0050403 A1 | 3/2006 | Neil | |
| 2007/0133107 A1* | 6/2007 | Ohzawa et al. | ............... 359/749 |
| 2009/0268305 A1 | 10/2009 | Pretorius | |
| 2010/0014168 A1 | 1/2010 | Rutzen | |

FOREIGN PATENT DOCUMENTS

| | | |
|---|---|---|
| DE | 30 21 791 A1 | 1/1981 |
| DE | 34 36 913 A1 | 4/1986 |
| DE | 3629438 A1 | 4/1988 |
| DE | 19 650 724 A1 | 6/1997 |
| DE | 19911862 C1 | 3/2001 |
| DE | 10 2006 057 9 | 6/2007 |
| DE | 10 2007 005 168 A1 | 7/2008 |
| DE | 10 2008 021 341 A1 | 11/2009 |
| GB | 2 430 272 A | 3/2007 |
| JP | 6014239 A | 1/1994 |
| WO | WO 01/04681 A1 | 1/2001 |

\* cited by examiner

*Primary Examiner* — Rochelle-Ann J Blackman

(74) *Attorney, Agent, or Firm* — Muirhead and Saturnelli, LLC

(57) ABSTRACT

An anamorphic objective is provided for imaging an object onto an image acquisition unit. The anamorphic objective has at least one first plane of symmetry and at least one second plane of symmetry. The first plane of symmetry and the second plane of symmetry are oriented perpendicular to one another. The first plane of symmetry and the second plane of symmetry intersect and have a straight line of intersection (intersection line). A first objective section followed by a second objective section are arranged. A diaphragm is arranged between the first objective section and the second objective section. A first anamorphic optical element is arranged in the first objective section. A second anamorphic optical element is arranged in the second objective section. The anamorphic objective fulfills specified conditions and is suitable for generating a stigmatic imaging of the object on the image acquisition unit.

24 Claims, 2 Drawing Sheets

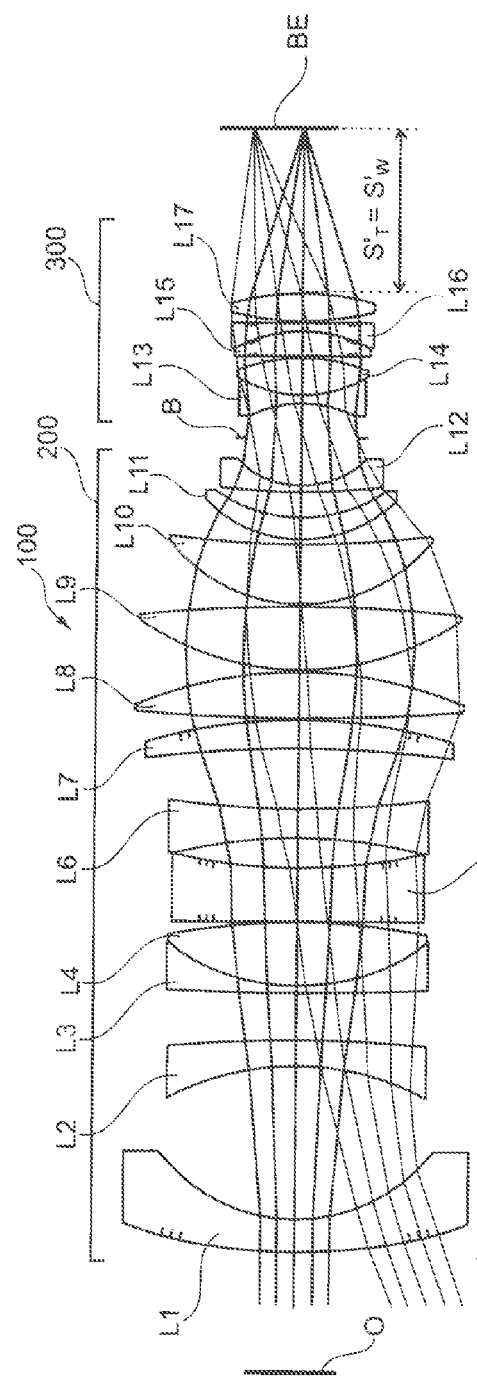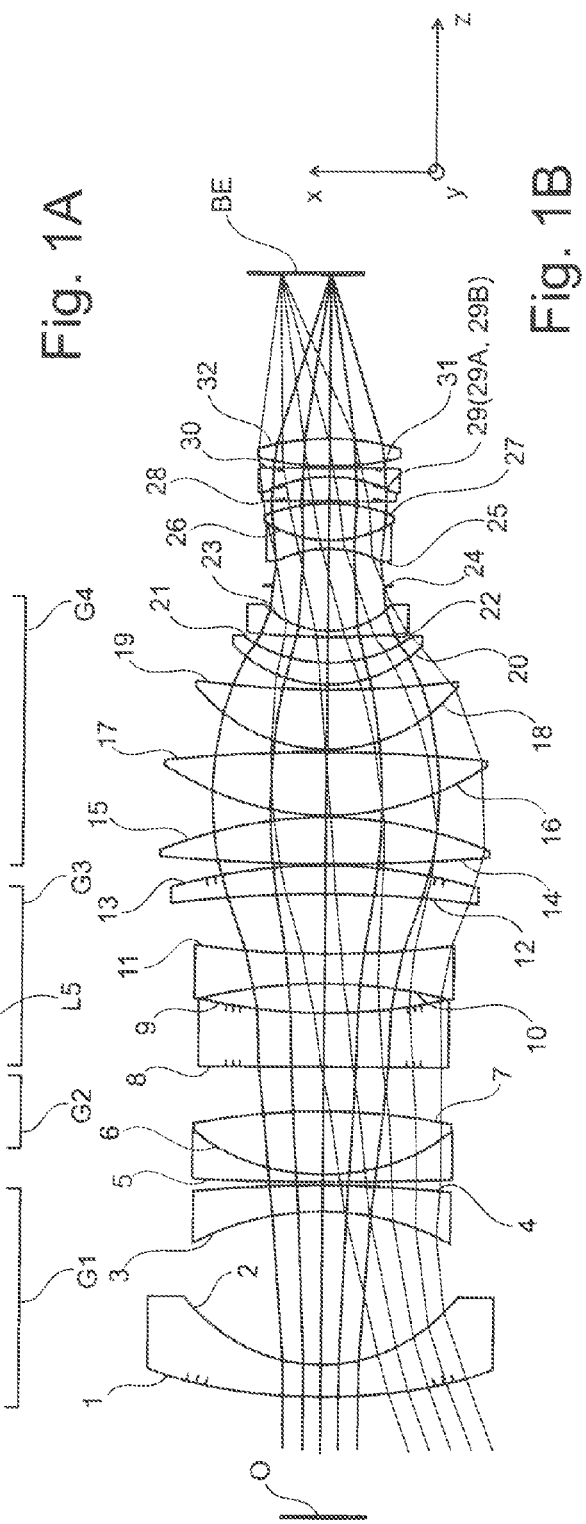

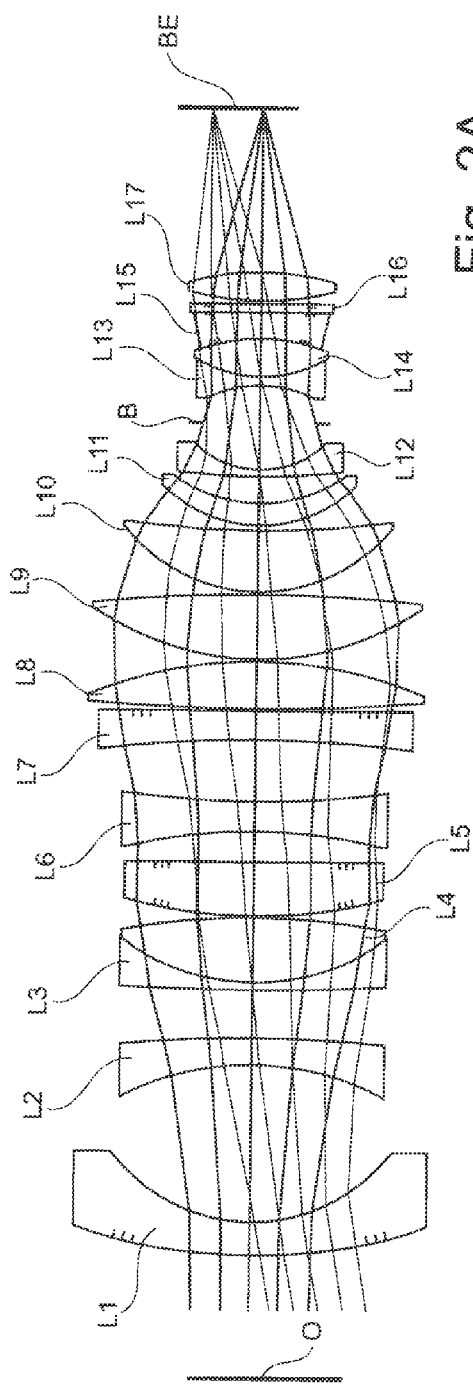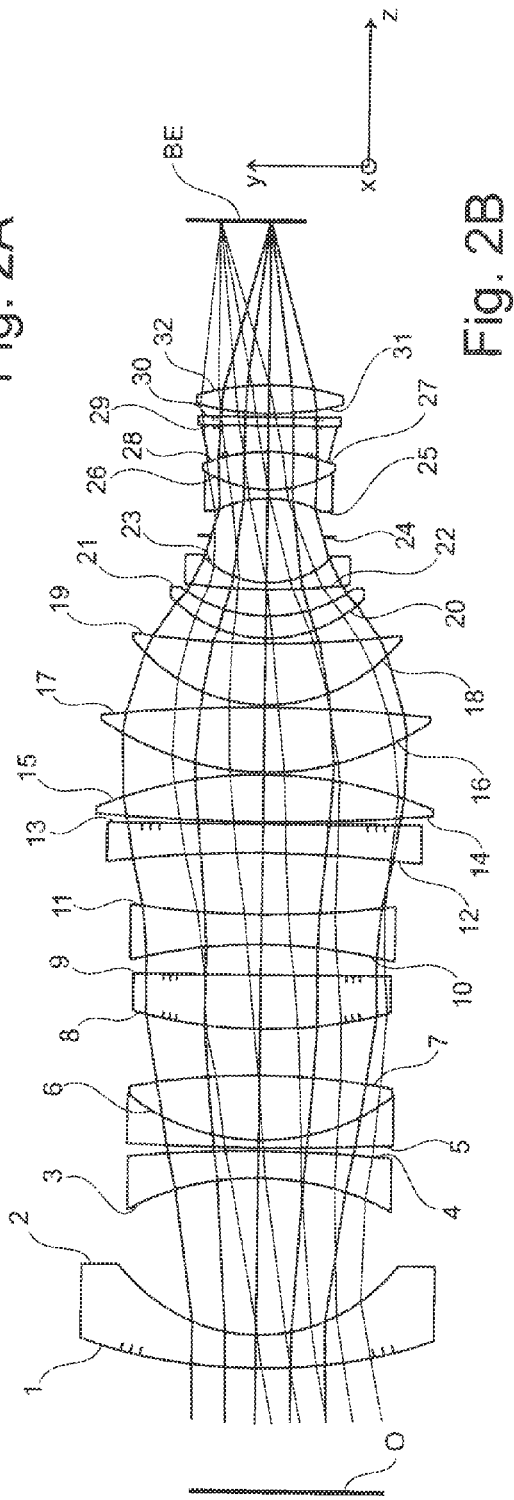

ANAMORPHIC OBJECTIVE

TECHNICAL FIELD

This application relates to an anamorphic objective for imaging an object onto an image acquisition unit. In this case, the anamorphic objective is provided, in particular, for a camera and/or a projector. An anamorphic objective is used, for example, to image an object onto a fixedly predetermined format of an image acquisition unit (for example a film or a digital recording medium) by compression. When an anamorphic objective is used for projection, the previously compressed imaging is represented in a rectified manner on a screen, for example.

BACKGROUND OF THE INVENTION

Optical systems having optical elements generally have an axis about which all of the optical elements of the optical system are constructed symmetrically. The aforementioned axis is designated as the optical axis of the optical system. The optical elements are constructed in rotationally symmetrical fashion.

An anamorphic objective, which likewise has optical elements, has no such axis as axis of symmetry. Rather, the anamorphic objective has at least one plane of symmetry about which at least some of the optical elements of the anamorphic objective are constructed in mirror-symmetrical fashion.

The system described herein relates to an anamorphic objective having two planes of symmetry, namely a first plane of symmetry and a second plane of symmetry. The first plane of symmetry is arranged perpendicular to the second plane of symmetry. The anamorphic objective has at least one lens element having a surface constructed in mirror-symmetrical fashion with respect to the first plane of symmetry and the second plane of symmetry. Such a lens element can be designated as an anamorphic lens element. The designation anamorphic optical element can be chosen as a different designation, for example, for said lens element.

The aforementioned surface of the anamorphic lens element can also be designated as an anamorphic surface. The latter is distinguished by the fact that it has a first curvature in the first plane of symmetry and a second curvature in the second plane of symmetry. The first curvature and the second curvature can be different. If the first curvature and/or the second curvature are/is zero (or infinite), then the anamorphic surface is cylindrical. If the first curvature and the second curvature are different, but have the same sign, then the anamorphic surface is embodied in toric fashion. If the signs are different from one another, then the anamorphic surface is a saddle surface.

The anamorphic optical element has a first refractive power with respect to the first plane of symmetry and a second refractive power with respect to the second plane of symmetry. The first refractive power can be different from the second refractive power.

The first plane of symmetry and the second plane of symmetry intersect and have a straight line of intersection (that is to say an intersection line). Said intersection line forms an optical axis of an optical element of the anamorphic objective. Since the anamorphic objective is generally composed of a plurality of optical elements, the plurality of optical elements in each case have an optical axis, which, however, generally overlap and form a common optical axis. This common optical axis is the optical axis of the anamorphic objective.

Anamorphic objectives which can be classified in three categories are known from the prior art.

A first category concerns objectives with an anamorphic supplementary system. Such objectives are known from DE 36 29 438 A1 and U.S. Pat. No. 4,362,366 for example, which are incorporated herein by reference. An anamorphic supplementary system generally has a plurality of lens groups separate from one another. One disadvantage of the objectives of this category is that the anamorphic supplementary system generally has a large diameter and also a large mass. The anamorphic supplementary system is therefore quite heavy. Furthermore, it has been found that focusing is difficult to carry out in the case of objectives of this category.

A second category of objectives concerns objectives comprising at least two subsystems. A first subsystem is embodied as a rotationally symmetrical objective comprising a plurality of lenses arranged successively in the direction of an image acquisition unit as seen from an object. A further subsystem comprising an anamorphic optical element is arranged between a last lens element of the rotationally symmetrical objective and an image acquisition unit. Such an objective is known from US 2006/0050403 A1 for example, which is incorporated herein by reference.

A third category of objectives concerns anamorphic objectives having at least one first lens element and at least one second lens element. At least one anamorphic optical element is arranged between the first lens element and the second lens element. Such an arrangement of an anamorphic objective is known, for example, from DE 10 2008 021 341 A1, which is incorporated herein by reference.

If the imaging of an axial object (that is to say of an object on the optical axis) by means of an anamorphic optical element is considered, then, it is established that this imaging is paraxially astigmatic. This means that image point positions of the imaging of the axial object in the first plane of symmetry and the second plane of symmetry are differently remote from the anamorphic optical element. The image point positions in the first plane of symmetry and second plane of symmetry are accordingly at a different distance from the anamorphic optical element.

By contrast, if the imaging of an axial object by means of a rotationally symmetrical optical element is considered, it is established that the imaging of the axial object is paraxially stigmatic. This means that a point embodied as an axial object is imaged onto an imaging point. However, the imaging of an abaxial object (that is to say an object which is not axial) by means of a rotationally symmetrical optical element can be astigmatic owing to aberrations present.

When taking a photograph, when recording an image for a film recording and/or when projecting an image or a photograph, an astigmatic imaging by means of an objective is not desirable. Rather, it is endeavored to achieve a stigmatic imaging by means of an objective for the aforementioned applications, since a stigmatic imaging leads to a better image quality.

Accordingly, it would be desirable to address the problem of specifying an anamorphic objective suitable for generating a stigmatic imaging of an object on an image acquisition unit.

SUMMARY OF THE INVENTION

According to the invention the anamorphic objective is provided for imaging an object onto an image acquisition unit. The anamorphic objective has at least one first plane of symmetry and at least one second plane of symmetry, wherein the first plane of symmetry and the second plane of symmetry are oriented perpendicular to one another. The first plane of symmetry and the second plane of symmetry intersect and have a straight line of intersection (intersection line).

The anamorphic objective according to the invention furthermore has at least one first objective section and at least one second objective section. As seen from an object to be imaged in the direction of an image acquisition unit there are arranged firstly the first objective section and then the second objective section. A diaphragm is arranged between the first objective section and the second objective section. At least one first anamorphic optical element is arranged in the first objective section. Furthermore, at least one second anamorphic optical element is arranged in the second objective section. The anamorphic objective according to the invention fulfills the following conditions:

$$\frac{f'_T}{f'_W} = AF \quad \text{(condition 1)}$$

and $$s'_T = s'_W \quad \text{(condition 2)}$$

$f'_T$ is the focal length of the anamorphic objective according to the invention with respect to the first plane of symmetry. Furthermore, $f'_W$ is the focal length of the anamorphic objective according to the invention with respect to the second plane of symmetry. The first plane of symmetry is identified here by the letter "T". By contrast, the second plane of symmetry is identified by the letter "W". The focal length of the anamorphic objective according to the invention in the first plane of symmetry T is a long focal length and the focal length of the anamorphic objective according to the invention in the second plane of symmetry W is a short focal length. This means that $f'_T$ is greater than $f'_W$. AF denotes a predetermined anamorphic factor, which will be discussed again further below.

Furthermore, $s'_T$ is a first distance between the second objective section and an image acquisition unit in the first plane of symmetry T. To put it more precisely, this is the distance between the vertex of a last optical surface, which is arranged at the second objective section, and an image acquisition unit in the first plane of symmetry T and wherein—as seen from an object to be imaged in the direction of an image acquisition unit—no further optical surface is arranged between the last optical surface and an image acquisition unit. $s'_W$ is a second distance between the second objective section and an image acquisition unit in the second plane of symmetry W. To put it more precisely, this is the distance between the vertex of the aforementioned last optical surface and an image acquisition unit in the second plane of symmetry W.

Considerations have revealed that, by virtue of the above-described arrangement of the individual elements and the fulfillment of the abovementioned conditions, a stigmatic image on an image acquisition unit can be achieved by means of the anamorphic objective according to the invention. In order to achieve a specific and predetermined anamorphic factor, the anamorphic objective according to the invention fulfills condition 1.

In particular, it is additionally or alternatively provided that the first objective section has a first lens group having negative refractive power, a second lens group, a third lens group and a fourth lens group having positive refractive power. By way of example, it is furthermore provided that—from an object to be imaged in the direction of an image acquisition unit—there are arranged firstly the first lens group, then the second lens group, then the third lens group and then the fourth lens group. In this case, hereinbefore and also hereinafter a lens group is understood to mean an arrangement composed of at least two lens elements. As an alternative thereto, a lens group can also consist of just one individual lens element. The individual lens groups will be discussed in greater detail further below.

The anamorphic objective according to the invention is provided, in particular, for imaging objects arranged at a different distance from the anamorphic objective according to the invention onto an image acquisition unit. In order to keep constant the position of an image plane, for example at an image acquisition unit, one embodiment of the anamorphic objective according to the invention provides for the second lens group of the first objective section to be provided with at least one focusing unit. The focusing unit is embodied, for example, as a focus group. It is explicitly pointed out that the focus group can consist either of an individual lens element or alternatively of a plurality of lens elements. The focusing will be discussed in greater detail below.

Before an object to be imaged is imaged on an image acquisition unit by the anamorphic objective according the invention, it is imaged by the optical elements containing contained in the anamorphic objective according to the invention. If the anamorphic objective according to the invention has a first optical element, the object to be imaged is imaged into an intermediate image by the first optical element of the anamorphic objective. The intermediate image can be real or virtual. The intermediate image thus generated is in turn imaged into a further intermediate image by a further, second optical element of the anamorphic objective. If further optical elements are then arranged upstream of the focusing unit of the anamorphic objective according to the invention, they generate an intermediate image, which now serves as object for the focusing unit. Proceeding therefrom, the exemplary embodiment is based on the following considerations. An astigmatic image, which can also be an intermediate image, is generated when either an astigmatic object, which can also be an intermediate image, is imaged by a rotationally symmetrical optical element or a stigmatic object, which can also be an intermediate image, is imaged by an anamorphic optical element. If the object to be imaged is stigmatic for a rotationally symmetrical optical element, the image generated by said rotationally symmetrical optical element is likewise stigmatic. The exemplary embodiment is based on the concept, then, that in the case of the present invention too, an object to be imaged by the focusing unit should be stigmatic. Accordingly, the exemplary embodiment of the anamorphic objective according to the invention additionally or alternatively provides for the first objective section to be provided with at least one focusing unit having at least two rotationally symmetrical optical elements. In an alternative embodiment, just one individual rotationally symmetrical optical element is also provided. In particular, it is provided that the focusing unit is composed exclusively of rotationally symmetrical optical elements.

As already mentioned above, one exemplary embodiment provides for the first objective section of the anamorphic objective according to the invention to have four lens groups. In this case, the second lens group is embodied as the focusing unit and is arranged between the first lens group and the third lens group. The third lens group is embodied, for example, as the first anamorphic optical element, which is arranged in the first objective section. Accordingly, only rotationally symmetrical lens elements are arranged between an object to be imaged and the first anamorphic optical element (or a first anamorphic lens element if the first anamorphic optical element is composed of a plurality of partial elements). Consequently, the first lens group, which is arranged in the region between an object to be imaged and the first anamorphic optical element generates a stigmatic intermediate image provided for the first anamorphic element at the same position for each object position.

In a further embodiment of the anamorphic objective according to the invention, it is additionally or alternatively provided that during a focusing operation by means of the focusing unit the following condition is fulfilled:

$$\frac{\beta_T}{\beta_W} = AF \qquad \text{(condition 3)}$$

wherein $\beta_T$ is a first magnification of the anamorphic objective in the first plane of symmetry T, $\beta_W$ is a second magnification of the anamorphic objective in the second plane of symmetry W, and AF is the predetermined anamorphic factor.

In a further embodiment of the anamorphic objective according to the invention, it is additionally or alternatively provided that the third lens group has the first anamorphic optical element as already mentioned above. Accordingly, the focusing unit is arranged upstream of the first anamorphic optical element as seen from an object to be imaged in the direction of an image acquisition unit.

In yet another exemplary embodiment of the anamorphic objective according to the invention, it is additionally or alternative provided that the focusing unit has at least one first lens element and at least one second lens element, wherein the first lens element and the second lens element can be formed from different types of glass. By way of example, the first lens element is formed from the glass KF9 from Schott. The second lens element is formed, for example, from the glass FK51 from Schott. It is explicitly pointed out that the invention is not restricted to the aforementioned types of glass. Rather, any suitable glass can be used. This exemplary embodiment is distinguished by the fact that it is possible to correct aberrations during focusing. The first lens element can have a first lens refractive power. By contrast, the second lens element can have a second lens refractive power. The first lens refractive power and the second lens refractive power can have different signs.

In a further exemplary embodiment of the anamorphic objective according to the invention, the first lens element and the second lens element form a doublet. In yet another embodiment of the anamorphic objective according to the invention, it is additionally or alternatively provided that the first lens element has at least one first surface embodied in aspherical fashion. Once again in addition or as an alternative thereto, it is provided that the second lens element has at least one second surface embodied in aspherical fashion.

In a further embodiment of the anamorphic objective according to the invention, it is additionally or alternatively provided that the first anamorphic optical element which is arranged in the first objective section, has a first refractive power in the first plane of symmetry T and a second refractive power in the second plane of symmetry W, wherein the first refractive power and the second refractive power have different signs. By way of example, it is provided that the first refractive power is positive, and that the second refractive power is negative. As an alternative thereto, it is provided that the first refractive power is negative and the second refractive power is positive.

In one embodiment of the anamorphic objective according to the invention it is provided that in addition to the first anamorphic optical element, a further anamorphic optical element in the form of a third anamorphic element is arranged in the first objective section. In particular, it is provided that both the first anamorphic optical element and the third anamorphic optical element are arranged in the third lens group.

Furthermore, it is provided, for example, that the third anamorphic optical element has a third refractive power in the first plane of symmetry T and a fourth refractive power in the second plane of symmetry W. In particular, it is provided that the third refractive power and the fourth refractive power have different signs. In a further embodiment, the first refractive power of the first anamorphic optical element in the first plane of symmetry T and the third refractive power of the third anamorphic optical element in the first plane of symmetry T have different signs. In addition it is provided, in particular, that the second refractive power of the first anamorphic optical element in the second plane of symmetry W and the fourth refractive power of the third anamorphic optical element in the second plane of symmetry W have different signs.

In yet another embodiment of the anamorphic objective, according to the invention, it is provided that in addition to the second anamorphic optical element, a further anamorphic optical element in the form of a fourth anamorphic optical element is arranged in the second objective section. Consequently, the invention also provides that the second objective section does not just have an individual anamorphic optical element, but rather can also have a plurality of anamorphic optical elements.

It is provided, in particular, that the second anamorphic optical element has a fifth refractive power in the first plane of symmetry T and a sixth refractive power in the second plane of symmetry W. Furthermore, it is provided, for example, that the fourth anamorphic optical element has a seventh refractive power in the first plane of symmetry T and an eighth refractive power in the second plane of symmetry W. The fifth refractive power and the sixth refractive power can have different signs with respect to one another. The seventh refractive power and the eighth refractive power can also have different signs with respect to one another. In a further embodiment, it is provided, for example, that the fifth refractive power of the second anamorphic optical element and the seventh refractive power of the fourth anamorphic optical element in the first plane of symmetry T have different signs. In addition or as an alternative thereto, it is provided that the sixth refractive power of the second anamorphic optical element and the eighth refractive power of the fourth anamorphic optical element in the second plane of symmetry W have different signs.

In a further exemplary embodiment of the anamorphic objective according to the invention, it is additionally or alternatively provided that the second anamorphic optical element and the fourth anamorphic optical element, which are both arranged in the second objective section, are cemented to one another at an anamorphic surface (called second anamorphic surface hereinafter). They form an anamorphic doublet (called second anamorphic doublet hereinafter). It is thereby possible to correct chromatic aberrations in the first plane of symmetry T and in the second plane of symmetry W separately. In a further embodiment of the anamorphic objective according to the invention, alternatively or additionally the first anamorphic optical element and the third anamorphic optical element are cemented to one another at an anamorphic surface (called first anamorphic surface hereinafter) and form an anamorphic doublet (called first anamorphic doublet hereinafter).

In a further exemplary embodiment of the anamorphic objective according to the invention, it is additionally or alternatively provided that the second anamorphic doublet in the second objective section has a positive refractive power in the second plane of symmetry W, which has a shorter focal length relative to the first plane of symmetry T, and a negative refractive power in the first plane of symmetry T. This makes it possible to correct the image field curvature in the first plane of symmetry T and/or in the second plane of symmetry W.

In yet another exemplary embodiment of the anamorphic objective according to the invention, it is additionally or alternatively provided that at least one aspherical surface is arranged in the first lens group.

Furthermore, it is provided, for example, that, in one embodiment of the anamorphic objective according to the invention, at least one lens element composed of a material having a low dispersion, that is to say having, for example, an Abbe number greater than or equal to 80, is arranged in the first lens group. In addition or as an alternative thereto, it provided that at least two lens elements having positive refractive power are arranged between the second lens group and the diaphragm and that the two lens elements are formed from a material having an Abbe number greater than or equal to 80 and thus likewise having a low dispersion.

In yet another embodiment of the anamorphic objective according to the invention, it is provided, for example, that
  in the second plane of symmetry the first anamorphic optical element has a negative refractive power,
  in the second plane of symmetry the second anamorphic optical element has a positive refractive power,
  in the first plane of symmetry the first anamorphic optical element has a positive refractive power, and that
  in the first plane of symmetry the second anamorphic optical element has a negative refractive power.

In yet another embodiment of the anamorphic objective according to the invention, it is provided, for example, that
  in the second plane of symmetry the first anamorphic optical element has a negative refractive power,
  in the second plane of symmetry the third anamorphic optical element has a positive refractive power,
  in the first plane of symmetry the first anamorphic optical element has a positive refractive power, and that
  in the first plane of symmetry the third anamorphic optical element has a negative refractive power.

Furthermore, it is provided, for example, that
  in the second plane of symmetry the second anamorphic optical element has a negative refractive power,
  in the second plane of symmetry the fourth anamorphic optical element has a positive refractive power,
  in the first plane of symmetry the second anamorphic optical element has a positive refractive power, and that
  in the first plane of symmetry the fourth anamorphic optical element has a negative refractive power.

In one embodiment of the anamorphic objective according to the invention, it is additionally or alternatively provided that
  the anamorphic objective has a first lens surface, which is arranged in such a way that no further lens surface is arranged between an object to be imaged and the first lens surface,
  the anamorphic objective has a second lens surface, which is arranged in such a way that no further lens surface is arranged between the second lens surface and an image acquisition unit, and in that
  the distance between the first lens surface, and the diaphragm is at least three times greater than the distance between the diaphragm and the second lens surface.

By way of example, the ratio of the distance between the first lens surface and the diaphragm and the distance between the diaphragm and the second lens surface is approximately 155/28, for example 155.28/28.03.

The system data mentioned further below for one exemplary embodiment apply to an anamorphic objective having at least one of the features mentioned above or below or a combination of at least two of the features mentioned above or below.

The system described herein furthermore relates to an optical system, for example a camera or a projector, comprising an image acquisition unit and an anamorphic objective having at least one of the features mentioned above or below or a combination of at least two of the features mentioned above or below.

BRIEF DESCRIPTION OF THE DRAWINGS

Embodiments of the system described herein are explained in greater detail below on the basis of the figures, which are briefly described as follows:

FIG. 1A shows a first sectional illustration of an anamorphic objective in a first focus position;

FIG. 1B shows a second sectional illustration of the anamorphic objective according to FIG. 1A in a second focus position;

FIG. 2A shows a third sectional illustration of the anamorphic objective according to FIG. 1A in the first focus position; and FIG. 2B shows a fourth sectional illustration of the anamorphic objective according to FIG. 1A in the second focus position.

DETAILED DESCRIPTION OF VARIOUS EMBODIMENTS

FIGS. 1A and 1B show illustrations of an X-Z section (plane X-Z) through an anamorphic objective 100 according to the invention in two different focus positions, namely a first focus position (FIG. 1A) and a second focus position (FIG. 1B). By contrast, FIGS. 2A and 2B show illustrations of a Y-Z section (plane Y-Z) through the anamorphic objective 100 in the two different focus positions, namely in the first focus position (FIG. 2A) and in the second focus position (FIG. 2B). The plane Y-Z is the first plane of symmetry T. By contrast, the plane X-Z is the second plane of symmetry W. The anamorphic objective 100 is explained in greater detail below.

The anamorphic objective 100 serves for imaging an object O (only illustrated schematically) onto a image acquisition unit BE. It has a first objective section 200 and a second objective section 300, which are each composed of a plurality of optical elements. The construction of the first objective section 200 and the construction of the second objective section 300 will now be explained in greater detail below.

The first objective section 200 has a plurality of lens groups namely a first lens group G1 having negative refractive power, a second lens group G2 having positive refractive power, an anamorphic third lens group G3 and a fourth lens group G4 having positive refractive power. The individual lens groups will be discussed in greater detail below.

The first lens group G1 has a first lens L1 having negative refractive power and a second lens L2 having negative refractive power. By way of example, the first lens L1 has a convex surface 1 directed toward the object O and a concave surface 2 directed toward the image acquisition unit BE. In particular, it is provided that at least one of the two aforementioned surfaces, namely the surface 1 and the surface 2, has an aspherical form. By way of example, the surface 1 is embodied in aspherical fashion. The second lens L2 likewise has two surfaces, namely a surface 3 directed toward the object O and a concave surface 4 directed toward the image acquisition unit BE. The first lens L1 and the second lens L2 of the first lens group G1 are rotationally symmetrical. Consequently, the first lens group G1 generates from the stigmatic object O a stigmatic intermediate image (not illustrated), which is in turn imaged by the second lens group G2. In order to correct chromatic aberrations, provision is made, for example, for producing at least one of the two lenses of the first lens group G1 from a material having low dispersion. By way of example, this is ensured by a material having an Abbe number of greater than or equal to 80. In the case of the embodiment illustrated here, the glass SFPL53 (designation according to Schott), which has an Abbe number greater than 90, was used for the material of the first lens L1 and of the second lens L2.

The second lens group G2 has positive refractive power and is designed as a focusing unit. It has two lenses, namely a third lens L3 and a fourth lens L4, the refractive powers of which have different signs. The third lens L3 has a surface 5 directed toward the object O to be imaged. The fourth lens L4 has a surface 6 directed toward the object O to be imaged and a surface 7 directed toward the image acquisition unit BE. The third lens L3 and the fourth lens L4 are cemented together to form a doublet at the surface 6. The second lens group G2 is provided as a focusing unit and is therefore used for a focusing operation in the anamorphic objective 100. For this purpose, the second lens group G2 is embodied as moveable along the optical axis OA. For focusing purposes, the second lens group G2 is moved, for example, in the direction of the image acquisition unit BE. As seen from the second lens group G2 (focusing unit) in the direction of the object O, there are arranged exclusively rotationally symmetrical optical elements.

In an alternative embodiment, the second lens group G2 has negative refractive power and is moved for focusing purposes for example in the direction of the object O to be imaged.

The third lens L3 and the fourth lens L4 are formed from different types of glass. Thus, in this exemplary embodiment, provision is made for the third lens L3 to be formed from the glass KF9 from Schott. By contrast, the fourth lens L4 in this exemplary embodiment is formed from the glass FK51 from Schott. In this way, it is particularly readily possible to correct aberrations during focusing.

The third lens group G3 is anamorphic. It has a first anamorphic lens element in the form of a fifth lens L5, a further rotationally symmetrical lens in the form of a sixth lens L6 having negative refractive power, and a further anamorphic lens element in the form of a seventh lens L7. The fifth lens L5 has a surface 8 directed toward the object O and a surface 9 directed toward the image acquisition unit BE. Furthermore, the sixth lens L6 has a surface 10 directed toward the object O and a surface 11 directed toward the image acquisition unit BE. Furthermore, the seventh lens L7 has a surface 12 directed toward the object O and a surface 13 directed toward the image acquisition unit BE.

The surfaces 8 and 9 of the fifth lens L5 are embodied in cylindrical fashion. The refractive power of the fifth lens L5 in the plane X-Z and the refractive power of the fifth lens L5 in the plane Y-Z have different signs. The refractive power of the fifth lens L5 is negative in the plane X-Z. By contrast, the refractive power of the fifth lens L5 is positive in the plane Y-Z. Furthermore, the surface 8 and the surface 9 have a specific radius in an X-direction and in a Y-direction, said radius being specified in the system data mentioned further below.

The sixth lens L6 of the third lens group G3 is rotationally symmetrical and has a biconcave form. The further anamorphic lens element in the form of the seventh lens L7 has—as already mentioned above—the surface 12 and the surface 13. The surface 12 is embodied in rotationally symmetrical fashion. By contrast, the surface 13 is embodied in cylindrical fashion. In the plane X-Z, the refractive power of the seventh lens L7 is positive. By contrast, the refractive power is negative in the plane Y-Z. Radii of the surface 13 are different in the plane X-Z and in the plane Y-Z.

Accordingly, in the exemplary embodiment illustrated in the figures, it is provided that firstly the first anamorphic optical element in the form of the fifth lens L5 and secondly the further anamorphic optical element in the form of the seventh lens L7 in the first plane of symmetry and in the second plane of symmetry respectively have a different refractive power in terms of the sign. It is additionally provided that the first anamorphic optical element in the form of the fifth lens L5 and the further anamorphic optical element in the form of the seventh lens L7 relative to one another are also provided with refractive powers having different signs with regard to one of the abovementioned planes.

The fourth lens group G4 of the first objective section 100 has a positive refractive power and has a plurality of lenses, namely an eighth lens L8, a ninth lens L9, a tenth lens L10, an eleventh lens L11 and a twelfth lens L12. The aforementioned lenses L8 to L12 are embodied in rotationally symmetrical fashion. The aforementioned lenses L8 to L12 also have surfaces. Thus, the eighth lens L8 is provided with a surface 14 directed toward the object O and a surface 15 directed toward the image acquisition unit BE. The ninth lens L9 has a surface 16 directed toward the object O and a surface 17 directed toward the image acquisition unit BE. The tenth lens L10 has a surface 18 directed toward the object O and a surface 19 directed toward the image acquisition unit BE. Furthermore, the eleventh lens L11 has a surface 20 directed toward the object O and a surface 21 directed toward the image acquisition unit BE. By contrast, the twelfth lens L12 has a surface 22 directed toward the object O and a surface 23 directed toward the image acquisition unit BE. The eighth lens L8, the ninth lens L9, the tenth lens L10 and the eleventh lens L11 have positive refractive power and are arranged in the beam path of the anamorphic objective 100 in such a way that a soft deflection of beams is obtained. In this case, a soft deflection is understood to mean a deflection of beams in this way if low aberration contributions occur. The reduction of aberrations in the case of a strong deflection (a deflection which is used when high aberration contributions occur) of the beams in the region of the fourth lens group G4 is influenced particularly greatly by the surfaces—curved in the direction of the image acquisition unit BE of the eighth lens L8, of the ninth lens L9, of the tenth lens L10, of the eleventh lens L11 and of the twelfth lens L12. In order to correct chromatic aberrations, at least one lens (in further embodiments at least two lenses) of the abovementioned lenses, namely the eighth lens L8, the ninth lens L9, the tenth lens L10 and the eleventh lens L11, which have positive refractive power, is formed from a glass having a low dispersion, that is to say the glass has an Abbe number of greater than or equal to 80.

The twelfth lens L12 of the fourth lens group G4 has negative refractive power. The surface 23 is embodied concavely toward the diaphragm B. The twelfth lens L12 can play a particular part in the correction of the image field curvature and of the chromatic aberrations. By way of example, a short flint with the designation NKZFS11 which enables good chromatic correction, is used as material for the twelfth lens L12.

As already mentioned above, the diaphragm B is arranged between the first objective section 100 and the second objective section 200. In this exemplary embodiment, the diaphragm B is embodied as an iris diaphragm having an adjustable aperture opening. The aperture opening can assume different opening sizes. In this case, it is also provided that the aperture opening can be completely closed.

The second objective section 200 has a plurality of lens elements. At least one of said lens elements is embodied in anamorphic fashion. Particular embodiments provide for at least two of said lens elements to be embodied in anamorphic fashion. In the exemplary embodiment illustrated in FIGS. 1A to 2B, the second objective section 200 has a thirteenth lens L13, a fourteenth lens L14, a fifteenth lens L15, a sixteenth lens L16 and a seventeenth lens L17. The aforementioned lenses L13 to L17 also have surfaces. Thus, the thirteenth lens L13 is provided with a surface 25 directed toward the object O. The fourteenth lens L14 has a surface 26 directed toward the object O and a surface 27 directed toward the image acquisition unit BE. Furthermore, the fifteenth lens L15 has a surface 28 directed toward the object O. The sixteenth lens L16 has a surface 29 directed toward the object O and a surface 30 directed toward the image acquisition unit BE. The seventeenth lens L17 has a surface 31 directed toward the object O and a surface 32 directed toward the image acquisition unit BE.

The surface 25 of the thirteenth lens L13 is embodied concavely toward the diaphragm B. The thirteenth lens L13 is used, in particular, for correction of the image field curvature and of the chromatic aberrations. It is cemented to the fourteenth lens L14, which has a positive refractive power.

The fifteenth lens L15 and the sixteenth lens L16 are cemented to one another and form a doublet. They basically have the common surface 29. The common surface 29 is formed by a surface 29A associated with the fifteenth lens L15 and a surface 29B associated with the sixteenth lens L16.

Both the fifteenth lens L15 and the sixteenth lens L16 are embodied in anamorphic fashion. In this case, the surface 28 and the surface 29B of the fifteenth lens L15 are embodied in cylindrical fashion. By contrast, in the case of the sixteenth lens L16, only the surface 29B is embodied in cylindrical fashion. The surface 30 of the sixteenth lens L16 is embodied in aspherical fashion.

The refractive power of the fifteenth element L15 is positive in the X-Z plane. In the Y-Z plane, the refractive power of the fifteenth lens L15 is negative. By contrast, the refractive power of the sixteenth lens L16 is negative in the X-Z plane. The refractive power of the sixteenth lens L16 in the Y-Z plane is positive.

Consequently, the fifteen lens L15 and the sixteenth lens L16 have different signs of their refractive powers in the two planes of symmetry mentioned above. The different refractive power distribution in the two planes of symmetry of this doublet enables a decoupling of the aberrations in the two planes of symmetry and the complete correction thereof. The doublet has a particularly good effect in the correction of chromatic aberrations.

A further correction of aberrations is brought about by the aspherical form of the surface 30 of the sixteenth lens L16. In particular, it has been found that the aspherical surface 30 is well suited to correcting a Koma and an oblique spherical aberration of beams running at a distance from the optical axis.

The seventeenth lens L17 has positive refractive power and, in the exemplary embodiment illustrated here, is formed from a glass having a relatively low dispersion (with regard to the term low dispersion, reference is made to the above text), in order to keep the contribution to the chromatic aberration small. By way of example glass having the designation FK51 is used here.

The anamorphic objective 100 described above has the system data specified in the following table.

| Surface | Radius in y-direction | Distance | Glass | Embodiment | Radius in x-direction |
|---|---|---|---|---|---|
| 1* | 163.39681 | 5.881750 | SFPL53 (O) | | |
| 2 | 32.35436 | 29.174111 | | | |
| 3 | −53.01777 | 4.997215 | SFPL53 (O) | | |
| 4 | −264.66870 | D1 | | | |
| 5 | 394.18443 | 1.499824 | KF9 (S) | | |
| 6 | 40.03106 | 12.109742 | FK51 (S) | | |
| 7 | −129.94507 | D2 | | | |
| 8 | 85.36961 | 10.139910 | SLAL18 (O) | CYL | Infinite |
| 9 | Infinite | 5.745489 | | CYL | 100.49360 |
| 10 | −90.31778 | 5.584149 | NKZFS4 (S) | | |
| 11 | 169.06360 | 11.536074 | | | |
| 12 | −242.28888 | 5.382441 | NKZFS5 (S) | | |
| 13 | Infinite | 0.349619 | | CYL | −108.98944 |
| 14 | 339.32392 | 9.204875 | SPHM52 (O) | | |
| 15 | −76.16216 | 0.199947 | | | |
| 16 | 52.53530 | 11.968239 | SFPL53 (O) | | |
| 17 | −398.11407 | 0.601260 | | | |
| 18 | 31.63510 | 11.578191 | SFPL53 (O) | | |
| 19 | 168.76467 | 1.029528 | | | |
| 20 | 24.82604 | 4.192567 | SYGH51 (O) | | |
| 21 | 26.93334 | 4.800256 | | | |
| 22 | 108.72738 | 1.499435 | NKZFS11 (S) | | |
| 23 | 16.99147 | 8.753506 | | | |
| 24 | Infinite | 7.000000 | | | |
| 25 | −21.61391 | 1.499897 | NKZFS11 (S) | | |
| 26 | 23.10884 | 7.218400 | SLAL14 (O) | | |
| 27 | −31.76636 | 0.198731 | | | |
| 28 | −39.08443 | 4.928972 | NPK51 (S) | CYL | Infinite |
| 29 | Infinite | 1.575267 | STIL2 (O) | CYL | −25.37124 |
| 30* | −320.64358 | 0.196759 | | | |

-continued

| Surface | Radius in y-direction | Distance | Glass | Embodiment | Radius in x-direction |
|---|---|---|---|---|---|
| 31 | 51.81995 | 5.412488 | FK51 (S) | | |
| 32 | −44.93400 | 31.686579 | | | |

In the above table, the numbers of the individual surfaces of the individual lenses are indicated, the diaphragm being designated by the number 24. Furthermore, the radii in the y-direction and in the x-direction and the distance between the vertex point of a first surface and the vertex point of a next surface are specified. Furthermore, the type of glass from which the individual lenses are formed is also specified, wherein types of glass from OHARA are identified by "O" and types of glass from Schott are identified by "S".

The radii and distances are provided without a unit in the system data above and also in the further description below. The unit can be chosen correspondingly suitably. By way of example, "mm" is provided as the unit. FIGS. 1A and 2A are illustrations for an object distance of 490 mm. Here, D1 is 8.555336 and D2 is 0.199678. FIGS. 1B and 2B are illustrations for an object distance "infinite". Here, D1 is 0.550708 and D2 is 8.504306.

Surfaces of individual lenses are embodied in aspherical fashion. These surfaces are identified by an "*", wherein the aspherical embodiment arises according to the following equation with the associated asphere coefficients:

$$z = \frac{ch^2}{1 + SQRT\{1 - (1+k)c^2h^2\}} + A_4h^4 + A_6h^6 + A_8h^8 +$$
$$A_{10}h^{10} + A_{12}h^{12} + A_{14}h^{14} + A_{16}h^{16} + A_{18}h^{18} + A_{20}h^{20} + A_{22}h^{22}$$

wherein z corresponds to the sagitta of the surface of a lens parallel to the z-axis, c corresponds to the curvature of the surface at the vertex of the lens, k corresponds to the conical constant, and $A_4$ to $A_{22}$ correspond to the aspherical coefficients of the $4^{th}$, $6^{th}$, $8^{th}$, $10^{th}$, $12^{th}$, $14^{th}$, $16^{th}$, $18^{th}$, $20^{th}$ and $22^{nd}$ orders.

The following coefficients hold true for the surface 1:

K=0.000000
$A_4$=0.176377E-05
$A_6$=−0.114120E-09
$A_8$=0.109855E-12,
$A_{10}$=0.160272E-17

The following coefficients hold true for the surface 30:

K=0.000000
$A_4$=0.757045E-05
$A_6$=−0.974364E-08
$A_8$=0.172532E-09
$A_{10}$=−0.925029E-12
$A_{12}$=0.200901E-14

The anamorphic objective 100 fulfills the conditions already mentioned above. Thus, the following holds true, in particular:

$$s'_T = s'_W \qquad \text{(condition 2)}$$

wherein both $s'_T$ and $s'_W$ in the exemplary embodiment illustrated here are 31.686579. Furthermore, the following also holds true:

$$\frac{f'_T}{f'_W} = AF \qquad \text{(condition 1)}$$

wherein $f'_T$=50 and $f'_W$=25, thus resulting in anamorphic factor of AF=2. In this case, the index T stands for the first plane of symmetry in the form of the plane Y-Z. By contrast, the index W stands for the second plane of symmetry in the form of the plane X-Z.

Furthermore, in the case of the anamorphic objective 100 illustrated, it is provided that, during a focusing operation by means of the focusing unit, the following condition is fulfilled:

$$\frac{\beta_T}{\beta_W} = AF \qquad \text{(condition 3)}$$

wherein $\beta_T$ and $\beta_W$ are dependent on the position of the object O to be imaged. By way of example, at least one of the two variables mentioned above lies in the range of between 0.04 and 0.01, inclusive here of the limits of the range. It is explicitly pointed out that the invention is not restricted to the values mentioned above.

The anamorphic objective 100 illustrated has all properties and advantages that have already been mentioned further above.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include volatile memory and/or non-volatile memory, and may include, for example, a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. An anamorphic objective for imaging an object onto an image acquisition unit, comprising:
   at least one first plane of symmetry and at least one second plane of symmetry, wherein the first plane of symmetry is oriented perpendicular to the second plane of symmetry;
   at least one first objective section and at least one second objective section, wherein, from the object to be imaged in a direction of the image acquisition unit, the first objective section is firstly arranged followed by the second objective section;
   a diaphragm arranged between the first objective section and the second objective section;
   at least one first anamorphic optical element arranged in the first objective section; and
   at least one second anamorphic optical element arranged in the second objective section,
   wherein the anamorphic objective fulfills the following conditions:

$$\frac{f'_T}{f'_W} = AF$$

and $$s'_T = s'_W$$

wherein
   $f'_T$ is the focal length of the anamorphic objective with respect to the first plane of symmetry,
   $f'_W$ is the focal length of the anamorphic objective with respect to the second plane of symmetry, wherein $f'_T$ is greater than $f'_W$,
   AF is a predetermined anamorphic factor,
   $s'_T$ is a first distance between the second objective section and the image acquisition unit in the first plane of symmetry, and
   $s'_W$ is a second distance between the second objective section and the image acquisition unit in the second plane of symmetry,
   wherein the first anamorphic optical element, which is arranged in the first objective section, has a first refractive power in the first plane of symmetry and a second refractive power in the second plane of symmetry, and wherein the first refractive power and the second refractive power have different signs.

2. The anamorphic objective according to claim 1, wherein one of the following is provided:
   (i) the first refractive power is positive and the second refractive power is negative, or
   (ii) the first refractive power is negative and the second refractive power is positive.

3. The anamorphic objective according to claim 1, further comprising:
   a further anamorphic optical element in the form of a third anamorphic optical element arranged in the first objective section.

4. The anamorphic objective according to claim 1, further comprising:
   a further anamorphic optical element in the form of a third anamorphic optical element arranged in the first objective section, wherein the third anamorphic optical element has a third refractive power in the first plane of symmetry and a fourth refractive power in the second plane of symmetry, wherein the first refractive power of the first anamorphic optical element in the first plane of symmetry and the third refractive power of the third anamorphic optical element in the first plane of symmetry have different signs, and wherein the second refractive power of the first anamorphic optical element in the second plane of symmetry and the fourth refractive power of the third anamorphic optical element in the second plane of symmetry have different signs.

5. The anamorphic objective according to claim 1, further comprising:
   a further anamorphic optical element in the form of a fourth anamorphic optical element arranged in the second objective section.

6. The anamorphic objective according to claim 5, wherein the second anamorphic optical element has a fifth refractive power in the first plane of symmetry and a sixth refractive power in the second plane of symmetry, wherein the fourth anamorphic optical element has a seventh refractive power in the first plane of symmetry and an eighth refractive power in the second plane of symmetry, wherein the fifth refractive power of the second anamorphic optical element and the seventh refractive power of the fourth anamorphic optical element in the first plane of symmetry have different signs, and wherein the sixth refractive power of the second anamorphic optical element and the eighth refractive power of the fourth anamorphic optical element in the second plane of symmetry have different signs.

7. The anamorphic objective according to claim 1, wherein, in the second plane of symmetry, the first anamorphic optical element has a negative refractive power, wherein, in the second plane of symmetry, the second anamorphic optical element has a positive refractive power, wherein, in the first plane of symmetry, the first anamorphic optical element has a positive refractive power, and wherein, in the first plane of symmetry, the second anamorphic optical element has a negative refractive power.

8. The anamorphic objective according to claim 1, further comprising:
   a third anamorphic optical element arranged in the first objective section, wherein, in the second plane of symmetry, the first anamorphic optical element has a negative refractive power, wherein, in the second plane of symmetry, the third anamorphic optical element has a positive refractive power, wherein, in the first plane of symmetry, the first anamorphic optical element has a positive refractive power, and wherein, in the first plane of symmetry the third anamorphic optical element has a negative refractive power.

9. The anamorphic objective according claim 1, further comprising:
   a fourth anamorphic optical element arranged in the second objective section, wherein, in the second plane of symmetry, the second anamorphic optical element has a negative refractive power, wherein, in the second plane of symmetry, the fourth anamorphic optical element has a positive refractive power, wherein, in the first plane of symmetry, the second anamorphic optical element has a positive refractive power, and wherein, in the first plane of symmetry, the fourth anamorphic optical element has a negative refractive power.

10. An anamorphic objective, for imaging an object onto an image acquisition unit, comprising:
- at least one first plane of symmetry and at least one second plane of symmetry, wherein the first plane of symmetry is oriented perpendicular to the second plane of symmetry;
- at least one first objective section and at least one second objective section, wherein, from the object to be imaged in a direction of the image acquisition unit, the first objective section is firstly arranged followed by the second objective section;
- a diaphragm arranged between the first objective section and the second objective section;
- at least one first anamorphic optical element arranged in the first objective section; and
- at least one second anamorphic optical element arranged in the second objective section,
- wherein the anamorphic objective fulfills the following conditions:

$$\frac{f'_T}{f'_W} = AF$$

and $$s'_T = s'_W$$

wherein
- $f'_T$ is the focal length of the anamorphic objective with respect to the first plane of symmetry,
- $f'_W$ is the focal length of the anamorphic objective with respect to the second plane of symmetry, wherein $f'_T$ is greater than $f'_W$,
- AF is a predetermined anamorphic factor,
- $s'_T$ is a first distance between the second objective section and the image acquisition unit in the first plane of symmetry, and
- $s'_W$ is a second distance between the second objective section and the image acquisition unit in the second plane of symmetry,
- wherein the first objective section has a first lens group having negative refractive power, a second lens group, a third lens group and a fourth lens group having positive refractive power, wherein, from the object to be imaged in the direction of the image acquisition unit, the first lens group is firstly arranged and, then the second lens group, then the third lens group and then the fourth lens group.

11. The anamorphic objective according to claim 10, wherein the second lens group of the first objective section is provided with at least one focusing unit, wherein the focusing unit has at least two rotationally symmetrical optical elements, and wherein the first lens group generates a stigmatic imaging.

12. The anamorphic objective according to claim 11, wherein, during a focusing operation using the focusing unit the following condition is fulfilled:

$$\frac{\beta_T}{\beta_W} = AF$$

wherein
- $\beta_T$ is a first magnification of the anamorphic objective in the first plane of symmetry,
- $\beta_W$ is a second magnification of the anamorphic objective in the second plane of symmetry, and
- AF is the predetermined anamorphic factor.

13. The anamorphic objective according to claim 11, wherein the third lens group has the first anamorphic optical element, such that the focusing unit is arranged upstream of the first anamorphic optical element as seen from the object to be imaged in the direction of the image acquisition unit.

14. The anamorphic objective according to claim 11, wherein the focusing unit has at least one first lens element and at least one second lens element, wherein the first lens element has a first lens refractive power and the second lens element has a second lens refractive power, and wherein the first lens refractive power and the second lens refractive power have different signs.

15. The anamorphic objective according to claim 14, wherein the first lens element and the second lens element form a doublet.

16. The anamorphic objective according to claim 14, wherein the focusing unit has at least one of the following features:
- (i) the first lens element has at least one first surface embodied in aspherical fashion, or
- (ii) the second lens element has at least one second surface embodied in aspherical fashion.

17. The anamorphic objective according to claim 10, wherein the first anamorphic optical element, which is arranged in the first objective section, has a first refractive power in the first plane of symmetry and a second refractive power in the second plane of symmetry, and wherein the first refractive power and the second refractive power have different signs.

18. The anamorphic objective according to claim 10, further comprising:
- at least one aspherical surface arranged in the first lens group.

19. The anamorphic objective according to claim 10, wherein at least one lens composed of a material having an Abbe number greater than or equal to 80 is arranged in the first lens group.

20. The anamorphic objective according to claim 10, wherein at least two lenses having positive refractive power are arranged between the second lens group and the diaphragm, and wherein the two lenses are formed from a material having an Abbe number greater than or equal to 80.

21. An anamorphic objective for imaging an object onto an image acquisition unit, comprising:
- at least one first plane of symmetry and at least one second plane of symmetry, wherein the first plane of symmetry is oriented perpendicular to the second plane of symmetry;
- at least one first objective section and at least one second objective section, wherein, from the object to be imaged in a direction of the image acquisition unit, the first objective section is firstly arranged followed by the second objective section;
- a diaphragm arranged between the first objective section and the second objective section;
- at least one first anamorphic optical element arranged in the first objective section;
- at least one second anamorphic optical element arranged in the second objective section,
- wherein the anamorphic objective fulfills the following conditions:

$$\frac{f_T'}{f_W'} = AF$$

and $$s_T' = s_W'$$

wherein
- $f_T'$ is the focal length of the anamorphic objective with respect to the first plane of symmetry,
- $f_W'$ is the focal length of the anamorphic objective with respect to the second plane of symmetry, wherein $f_T'$ is greater than $f_W'$,
- AF is a predetermined anamorphic factor,
- $s_T'$ is a first distance between the second objective section and the image acquisition unit in the first plane of symmetry, and
- $s_W'$ is a second distance between the second objective section and the image acquisition unit in the second plane of symmetry;
- a third anamorphic optical element arranged in the first objective section; and
- a fourth anamorphic optical element arranged in the second objective section, and
- at least one of the following features:
  (i) the first anamorphic optical element and the third anamorphic optical element are cemented to one another at a first anamorphic surface and form a first anamorphic doublet; or
  (ii) the second anamorphic optical element and the fourth anamorphic optical element are cemented to one another at a second anamorphic surface and form a second anamorphic doublet.

22. The anamorphic objective according to claim 21, wherein, the second anamorphic doublet in the second objective section has a positive refractive power in the second plane of symmetry and a negative refractive power in the first plane of symmetry.

23. An anamorphic objective for imaging an object onto an image acquisition unit, comprising:
- at least one first plane of symmetry and at least one second plane of symmetry, wherein the first plane of symmetry is oriented perpendicular to the second plane of symmetry;
- at least one first objective section and at least one second objective section, wherein, from the object to be imaged in a direction of the image acquisition unit, the first objective section is firstly arranged followed by the second objective section;
- a diaphragm arranged between the first objective section and the second objective section;
- at least one first anamorphic optical element arranged in the first objective section;
- at least one second anamorphic optical element arranged in the second objective section,
- wherein the anamorphic objective fulfills the following conditions:

$$\frac{f_T'}{f_W'} = AF$$

and $$s_T' = s_W'$$

wherein
- $f_T'$ is the focal length of the anamorphic objective with respect to the first plane of symmetry,
- $f_W'$ is the focal length of the anamorphic objective with respect to the second plane of symmetry, wherein $f_T'$ is greater than $f_W'$,
- AF is a predetermined anamorphic factor,
- $s_T'$ is a first distance between the second objective section and the image acquisition unit in the first plane of symmetry, and
- $s_W'$ is a second distance between the second objective section and the image acquisition unit in the second plane of symmetry;
- a first lens surface arranged in such a way that no further lens surface is arranged between the object to be imaged and the first lens surface; and
- a second lens surface arranged in such a way that no further lens surface is arranged between the second lens surface and the image acquisition unit, wherein a distance between the first lens surface and the diaphragm is at least three times greater than the distance between the diaphragm and the second lens surface.

24. An optical system, comprising:
- an image acquisition unit; and
- an anamorphic objective for imaging an object onto the image acquisition unit, wherein the anamorphic objective includes:
  - at least one first plane of symmetry and at least one second plane of symmetry, wherein the first plane of symmetry is oriented perpendicular to the second plane of symmetry;
  - at least one first objective section and at least one second objective section, wherein, from the object to be imaged in a direction of the image acquisition unit, the first objective section is firstly arranged followed by the second objective section;
  - a diaphragm arranged between the first objective section and the second objective section;
  - at least one first anamorphic optical element arranged in the first objective section; and
  - at least one second anamorphic optical element arranged in the second objective section,
- wherein the anamorphic objective fulfills the following conditions:

$$\frac{f_T'}{f_W'} = AF$$

and $$s_T' = s_W'$$

wherein
- $f_T'$ is the focal length of the anamorphic objective with respect to the first plane of symmetry,
- $f_W'$ is the focal length of the anamorphic objective with respect to the second plane of symmetry, wherein $f_T'$ is greater than $f_W'$, AF is a predetermined anamorphic factor, $s'_T$ is a first distance between the second objective section and the image acquisition unit in the first plane of symmetry, and $s'_W$ is a second distance between the second objective section and the image acquisition unit in the second plane of symmetry, wherein the first anamorphic optical element, which is arranged in the first objective section, has a first refractive power in the first plane of symmetry and a second refractive power in the second plane of symmetry, and wherein the first refractive power and the second refractive power have different signs.

\* \* \* \* \*